(12) United States Patent
Oh (10) Patent No.: US 9,232,115 B2
(45) Date of Patent: Jan. 5, 2016

(54) AUDIO PLAYING SCHEME FOR DIGITAL BILLBOARD SYSTEM

(75) Inventor: Hyun Oh Oh, Gyeonggi-do (KR)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 13/810,497

(22) PCT Filed: Jul. 17, 2012

(86) PCT No.: PCT/US2012/047002
§ 371 (c)(1),
(2), (4) Date: Jan. 16, 2013

(87) PCT Pub. No.: WO2014/014447
PCT Pub. Date: Jan. 23, 2014

(65) Prior Publication Data
US 2014/0022454 A1    Jan. 23, 2014

(51) Int. Cl.
H04N 7/16        (2011.01)
H04N 5/04        (2006.01)
H04N 21/414      (2011.01)
H04N 21/43       (2011.01)
H04N 21/45       (2011.01)
H04N 21/658      (2011.01)
H04N 21/81       (2011.01)

(52) U.S. Cl.
CPC ........... *H04N 5/04* (2013.01); *H04N 21/41415* (2013.01); *H04N 21/4307* (2013.01); *H04N 21/4524* (2013.01); *H04N 21/6581* (2013.01); *H04N 21/8106* (2013.01)

(58) Field of Classification Search
USPC ......... 725/82, 91, 93, 94, 103, 116, 123, 133, 725/141, 153
See application file for complete search history.

(56) References Cited

U.S. PATENT DOCUMENTS

| | | | | |
|---|---|---|---|---|
| 5,510,828 | A | * | 4/1996 | Lutterbach et al. ........... 725/138 |
| 8,130,242 | B2 | * | 3/2012 | Cohen ........................... 345/632 |
| 2007/0067808 | A1 | * | 3/2007 | DaCosta ......................... 725/62 |
| 2007/0268883 | A1 | * | 11/2007 | Quelle et al. .................. 370/349 |
| 2010/0020752 | A1 | | 1/2010 | Anshutz et al. |
| 2011/0035282 | A1 | * | 2/2011 | Spatscheck et al. ....... 705/14.58 |
| 2011/0125584 | A1 | | 5/2011 | Vanderwall et al. |
| 2012/0130796 | A1 | * | 5/2012 | Busch ........................ 705/14.36 |
| 2013/0313313 | A1 | * | 11/2013 | Boudville ...................... 235/375 |

OTHER PUBLICATIONS

International Search Report & Written Opinion dated Oct. 15, 2012 for PCT/US12/47002.

(Continued)

*Primary Examiner* — Nnenna Ekpo
(74) *Attorney, Agent, or Firm* — Brundidge & Stanger, P.C.

(57) ABSTRACT

Technologies are generally described for an audio playing scheme for digital billboard systems. In some examples, a method performed under control of a server may include receiving from an end device a control signal configured to indicate that the end device is located in a first predetermined area relative to a first digital billboard, identifying first video data currently displayed on the first digital billboard, determining first audio data corresponding to the first video data, and transmitting the first audio data to the end device based on the control signal.

21 Claims, 9 Drawing Sheets

(56) References Cited

OTHER PUBLICATIONS

Project Glass—Google+, 1 page taken from the Internet on Apr. 5, 2012 <https://plus.google.com/111626127367496192147/posts>.

Dapeng Wu et al., "Streaming Video over the Internet: Approaches and Directions", IEEE Transactions on Circuits and Systems for Video Technology, vol. 11, No. 3, Mar. 2001.

* cited by examiner

AUDIO PLAYING SCHEME FOR DIGITAL BILLBOARD SYSTEM

CROSS-REFERENCE TO RELATED APPLICATION

This Application is the National Stage filing under 35 U.S.C. §371 of PCT Application Ser. No. PCT/US12/47002 filed on Jul. 17, 2012. The disclosure of the PCT Application is hereby incorporated herein by reference in its entirety.

BACKGROUND

Digital technologies have experienced phenomenal growth in the last few years. Advertisement has adopted such technologies. For example, a digital billboard on a street is a popular method for advertising. Advertisement on the digital billboard can be easily exposed to drivers in cars, passengers using public transportation, pedestrians, and so on.

SUMMARY

In an example, a method performed under control of a server may include receiving from an end device a control signal configured to indicate that the end device is located in a first predetermined area relative to a first digital billboard, identifying first video data currently displayed on the first digital billboard, determining first audio data corresponding to the first video data, and transmitting the first audio data to the end device based on the control signal.

In an example, a method performed under control of an end device may include determining whether the end device is located in a predetermined area relative to a digital billboard, transmitting to a server a control signal configured to indicate that the end device is located in the predetermined area relative to the digital billboard, receiving from the server audio data corresponding to video data currently displayed on the digital billboard, and playing the audio data.

In an example, a server may include a signal receiving unit configured to receive from an end device a control signal indicating that the end device is located in a first predetermined area relative to a first digital billboard, an identifying unit configured to identify first video data currently displayed on the first digital billboard and first audio data corresponding to the first video data, and an audio transmitting unit configured to transmit the first audio data to the end device based on the control signal.

In an example, an end device may include a determining unit configured to determine whether the end device is located in a predetermined area relative to a digital billboard, a transmitting unit configured to transmit to a server a control signal indicating that the end device is located in the predetermined area relative to the digital billboard, a receiving unit configured to receive from the server audio data corresponding to video data currently displayed on the digital billboard, and a player configured to play the audio data.

In an example, a computer-readable storage medium may store computer-executable instructions that, in response to execution, cause an end device to perform operations including determining whether the end device is located in a predetermined area relative to a digital billboard, transmitting to a server a control signal configured to indicate that the end device is located in the predetermined area relative to the digital billboard, receiving from the server audio data corresponding to video data currently displayed on the digital billboard, and playing the audio data.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the drawings, can be arranged, substituted, combined, separated, and designed in a wide variety of different configurations, all of which are explicitly contemplated herein.

This disclosure is generally drawn, inter alia, to methods, apparatuses, systems, devices, and computer program products related to an audio playing scheme for digital billboard systems.

Technologies are generally described for a digital billboard system configured to provide media content, such as, for example, one or more still photographs, an advertisement, a commercial, a movie trailer, etc., on a digital billboard. While all of the foregoing examples, and more, of visual media content are contemplated by the embodiments described herein, the description will reference "video data" but not to exclusion of the foregoing examples. In some embodiments, the digital billboard system may provide audio data corresponding to video data being played on the digital billboard to a user (e.g., a driver, a passenger or a pedestrian carrying his/her end device) when the user enters into a predetermined area relative to the digital billboard. In some embodiments, the predetermined area relative to the digital billboard may be an area in which the user may be able to see the video data being displayed on the digital billboard.

In some embodiments, the end device may receive synchronization information between the video data and the audio data, and play the audio data by using the synchronization information. In some embodiments, the audio data may be transmitted together with a promotion coupon. Also, the audio data may be transmitted only to an end device that has subscribed to a digital billboard service provided by the digital billboard system.

In some embodiments, a server, which may transmit the audio data to the end device, may transmit the video data to the digital billboard in real time. In such cases, the server may transmit to the end device information regarding displaying of the video data, as synchronization information. In some alternative embodiments, the server may transmit the video data to a buffer, and the buffer may store the video data and transmit or relay the video data to the digital billboard. In such cases, the digital billboard may receive the video data from the buffer and play the received video data. The digital billboard may transmit to the buffer information regarding the playing of the video data that is currently being displayed, and the buffer may transmit or relay to the end device the received information, as synchronization information. Accordingly, the user may experience the audio-visual contents.

In some embodiments, the end device may be located in an area relative to multiple digital billboards. In such cases, the end device may receive and display audio data of contents played on one of the multiple digital billboards at which the end device is currently aiming. The end device may determine aiming information regarding a direction at which the end device is currently aiming, by using a sensor such as, for example, a GPS (global positioning system) sensor, a compass, an accelerometer, a gyroscope, etc.

In some embodiments, the user, who has been viewing the media content displayed on the one digital billboard, may try to view other media content displayed on another digital billboard. In such cases, the user may change the direction of the end device, and perform a predetermined action such as, for example, pushing a predetermined key, speaking a predetermined phrase, or making a predetermined gesture, etc. Then, the end device may receive and play audio data of the contents being played in the newly-aimed digital billboard.

Figure 1:
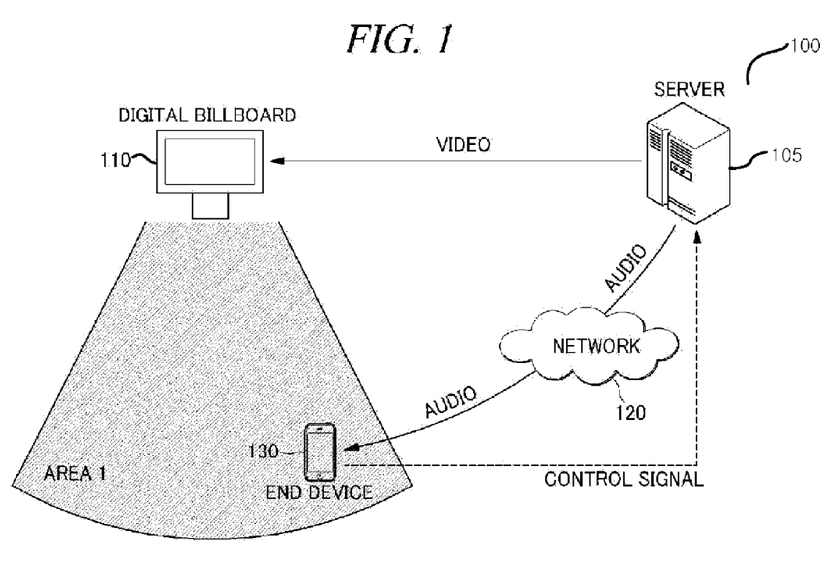
FIG. 1 schematically shows an illustrative example of a system in which an end device is located in an area associated with a digital billboard, arranged in accordance with at least some embodiments described herein.

FIG. 1 schematically shows an illustrative example of a system in which an end device is located in an area associated with a digital billboard, arranged in accordance with at least some embodiments described herein. As depicted in FIG. 1, a system 100 may include a server 105, a digital billboard 110, a network 120 and an end device 130.

As depicted in FIG. 1, server 105 may transmit video data to digital billboard 110, so that digital billboard 110 may display the video data thereon. Digital billboard 110 may define Area 1, a user located in which may be able to see the video data being displayed on digital billboard 110. In some embodiment, once end device 130 enters into Area 1 relative to digital billboard 110, end device 130 may transmit a control signal including location information of end device 130 to server 105 via network 120. Examples of server 105 may include, but are not limited to, an application server, a standalone server, a web server, and any other devices having signal receiving capability, data identifying capability, data transmitting capability, and communication capability. Examples of digital billboard 110 may include, but are not limited to, a cathode ray tube display, a light-emitting diode display, an electroluminescent display, an electronic paper, a plasma display panel, a liquid crystal display, an organic light-emitting diode display, an interferometric modulator display, and any other devices having visual media content displaying capability and communication capability. Examples of network 120 may include, but are not limited to, a computer network, an internet, a telephone network, a TCT/IP data network (wide area networks, metropolitan area networks, local area networks, campus area networks, virtual private networks), and any other devices having communication capability. Examples of end device 130 may include, but are not limited to, a smartphone, a mobile phone, a personal digital assistant (PDA), a tablet, a mobile game console, a car audio device, a navigation device, and any other devices having audio playing capability, location information identifying capability, and communication capability.

In some embodiments, based on the location information of end device 130 included in the control signal received from end device 130, server 105 may transmit to end device 130 audio data corresponding to the video data being currently displayed on digital billboard 110. In such cases, a data communication channel may be used for transmitting the audio data. Alternatively, a voice communication channel or a communications protocol such as a multimedia broadcast multicast service (MBMS) may also be used. In some embodiments, the audio data may be transmitted to end device 130 based at least in part on data streaming. In some embodiments, if the data communication channel is used, preloading of the audio data on end device 130 may be possible. Thus, server 105 may transmit the audio data to end device 130 together with synchronization information. In such cases, end device 130 may store the audio data received from server 105 in a buffer and play the audio data by using the received synchronization information.

Figure 2:
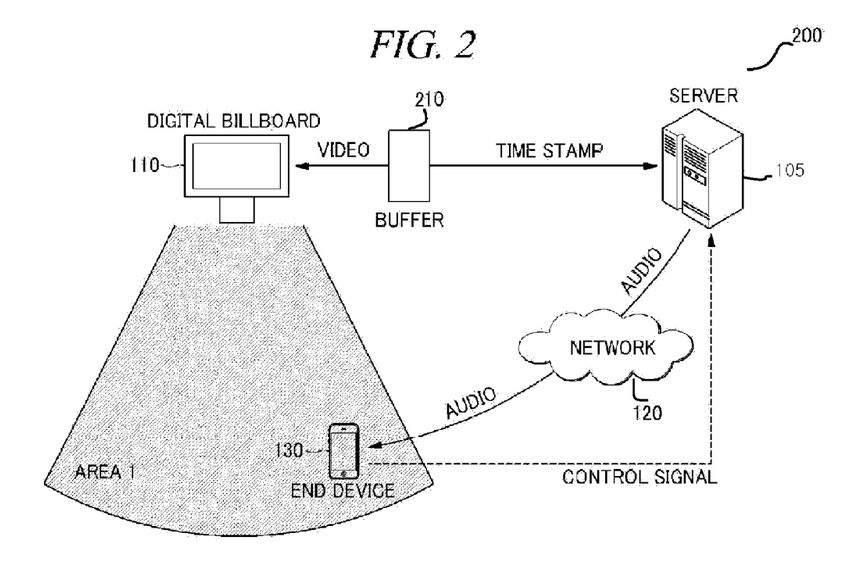
FIG. 2 schematically shows another illustrative example of a system in which an end device is located in an area associated with a digital billboard, arranged in accordance with at least some embodiments described herein.

FIG. 2 schematically shows another illustrative example of a system in which an end device is located in an area associated with a digital billboard, arranged in accordance with at least some embodiments described herein. As depicted in FIG. 2, a system 200 may include a server 105, a digital billboard 110, a network 120, an end device 130 and a buffer 210. In FIG. 2, similar elements to those shown in FIG. 1 are indicated with similar reference numerals, and thus a description thereof will be omitted for the sake of simplicity.

As depicted in FIG. 2, buffer 210 may store video data therein. Digital billboard 110 may receive the video data from buffer 210 and display the video data. In some embodiments, buffer 210 may transmit to server 105 a time stamp indicating the displaying of the video data, so that server 105 may use the time stamp for synchronization between the video data and audio data to be transmitted to end device 130. In some embodiments, buffer 210 may periodically transmit the time stamp to server 105, transmit the time stamp every time starting to display new video data, or transmit the time stamp when server 105 requests the time stamp. Upon receiving from end device 130 a control signal including location information of end device 130, server 105 may identify the video data being displayed on digital billboard 110 based at least in part on the time stamp received from buffer 210.

In some embodiments, in order to minimize data traffic, server 105 may be located in a place near Area 1, or may be located within digital billboard 110.

In some embodiments, once end device 130 may receive the audio signal from server 105 and transmit a confirmation signal to server 105, server 105 may issue a promotion coupon in real time and send the promotion coupon to end device 130. The promotion coupon may promote subscribers to digital billboard 110.

In some embodiments, server 105 may receive from end device 130 identification information of end device 130 for subscription to digital billboard 110, and register end device 130 in an end device list of digital billboard 110. By way of example, but not limitation, the identification information received from end device 130 may include video images captured by a camera corresponding to end device 130, a shape of a frame of digital billboard 110, a shape of a building around digital billboard 110, a code attached to digital billboard 110 or the periphery thereof, location information of end device 130, or others. In some embodiments, after receiving the control signal from end device 130, server 105 may transmit the audio data only to the registered end device 130 with reference to the end device list.

Figure 3:
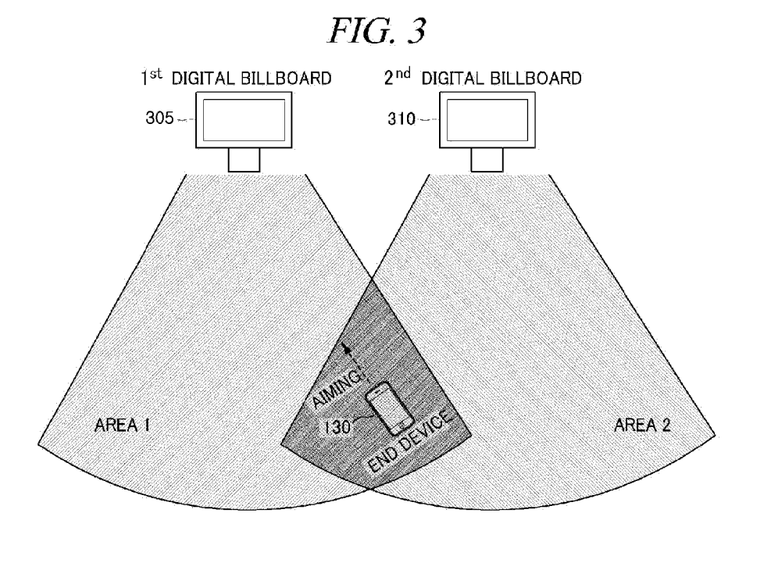
FIG. 3 schematically shows an illustrative example of a system in which an end device is located in an area associated with multiple digital billboards, arranged in accordance with at least some embodiments described herein.

FIG. 3 schematically shows an illustrative example of a system in which an end device is located in an area associated with multiple digital billboards, arranged in accordance with at least some embodiments described herein. As depicted in FIG. 3, a system 300 may include a first digital billboard 305, a second digital billboard 310 and an end device 130.

As depicted in FIG. 3, end device 130 may be located in an area relative to multiple digital billboards, e.g., first digital billboard 305 and second digital billboard 310. Although FIG. 3 illustrates end device 130 located in an area relative to two digital billboards, it should be appreciated by one skilled in the relevant art that end device 130 may be located in an area relative to three or more digital billboards.

In some embodiments, end device 130 may transmit to server 105 aiming information, which may be information regarding a direction at which end device 130 is currently aiming, together with a control signal. End device 130 may generate or determine the aiming information by using a sensor such as, for example, a GPS sensor, a compass, an accelerometer, or a gyroscope. Upon receiving the control signal including the aiming information, server 105 may transmit to end device 130 audio data corresponding to a digital billboard at which end device 130 is currently aiming (i.e., first digital billboard 305), based at least in part on the received aiming information.

In some embodiments, server 105 may transmit audio data corresponding to all relevant digital billboards (i.e., digital billboards 305, 310) to end device 130. Upon receiving the audio data, end device 130 may select and play audio data corresponding to a digital billboard at which end device 130 is currently aiming (i.e., first digital billboard 305).

In some alternative embodiments, end device 130 may select one of digital billboards 305, 310 in the area where end device 130 is located in a random manner or based on user preference or past records of end device 130 instead of using the aiming information, and play audio data corresponding to the selected digital billboard.

In some embodiments, when end device 130 requests a change of digital billboard during playing of the audio data corresponding to first digital billboard 305 while aiming at second digital billboard 310, server 105 may send to end device 130 audio data corresponding to second digital billboard 310. In such cases, end device 130 may play the audio data corresponding to video data being played in second digital billboard 310.

Figure 4:
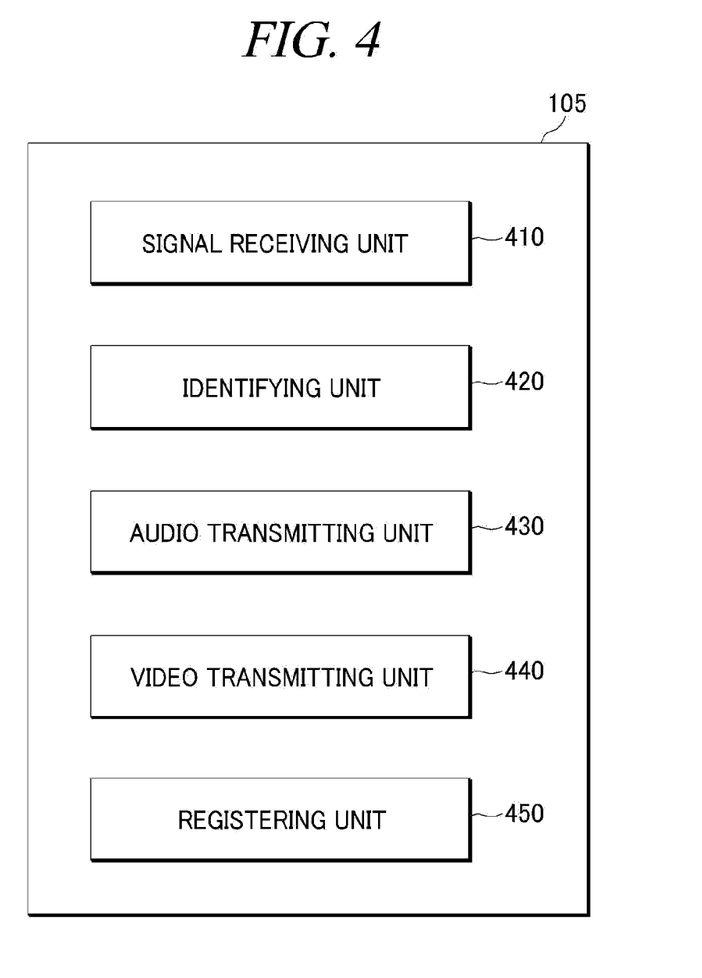
FIG. 4 shows a schematic block diagram illustrating an example architecture of a server for providing an audio playing scheme for a digital billboard system, arranged in accordance with at least some embodiments described herein.

FIG. 4 shows a schematic block diagram illustrating an example architecture of a server for providing an audio playing scheme for a digital billboard system, arranged in accordance with at least some embodiments described herein.

As depicted, server 105 may include a signal receiving unit 410, an identifying unit 420 and an audio transmitting unit 430. In some embodiments, optionally, server 105 may further include a video transmitting unit 440 and/or a registering unit 450. Although illustrated as discrete components, various components may be divided into additional components, combined into fewer components, or eliminated altogether while being contemplated within the scope of the disclosed subject matter.

Signal receiving unit 410 may be configured to receive, from end device 130, a control signal indicating that end device 130 is located in a predetermined area relative to digital billboard 110. In some embodiments, the predetermined area relative to digital billboard 110 may be an area in which a user of end device 130 may be able to view contents displayed on digital billboard 110.

Identifying unit 420 may be configured to identify video data being currently displayed on digital billboard 110 and audio data corresponding to the video data. Since the control signal received by signal receiving unit 410 may include location information of end device 130, identifying unit 420 may use the location information to identify the video data being currently displayed on digital billboard 110 and audio data corresponding to the video data.

Audio transmitting unit 430 may be configured to transmit the audio data to end device 130 based at least in part on the control signal received by signal receiving unit 410. In some embodiments, audio transmitting unit 430 may transmit to end device 130 information regarding synchronization between the video data and the audio data. In some embodiments, audio transmitting unit 430 may transmit to end device 130 a promotion coupon with the audio data.

In some embodiments, signal receiving unit 410 may receive a control signal indicating that end device 130 is located in an area relative to multiple digital billboards. In such cases, the control signal may include aiming information indicating which one of the multiple digital billboards end device 130 currently aims at. In such cases, audio transmitting unit 430 may transmit to end device 130 audio data corresponding to a digital billboard at which end device 130 is currently aiming, based at least in part on the received aiming information.

In some alternative embodiments, when signal receiving unit 410 receives the control signal indicating that end device 130 is located in the area relative to multiple digital billboards, audio transmitting unit 430 may transmit to end device 130 audio data corresponding to all relevant digital billboards. Upon receiving the audio data, end device 130 may select and play audio data corresponding to one of the multiple digital billboards at which end device 130 is currently aiming.

Video transmitting unit 440 may be configured to transmit the video data to digital billboard 110. In some embodiments, video transmitting unit 440 may transmit the video data to digital billboard 110 in real time. In some alternative embodiments, video transmitting unit 440 may be configured to transmit video data to buffer 210, so that buffer 210 may store the video data and provide the video data to digital billboard 110. When buffer 210 transmits the video data to digital billboard 110 to be displayed thereon, signal receiving unit 410 may receive from buffer 210 a time stamp indicating the displaying of the video data, and identifying unit 420 may identify the currently played video data based at least in part on the time stamp.

In some embodiments, signal receiving unit 410 may receive from end device 130 identification information corresponding to digital billboard 110. By way of example, but not limitation, the identification information received from end device 130 may include video images captured by a camera corresponding to end device 130, a shape of a frame of digital billboard 110, a shape of a building located near digital billboard 110, a code attached to digital billboard 110 or the periphery thereof, or location information of end device 130.

In some embodiments, registering unit 450 may be configured to register end device 130 in an end device list based at least in part on the identification information. In some embodiments, audio transmitting unit 430 may transmit the audio data based at least in part on the end device list.

Figure 5:
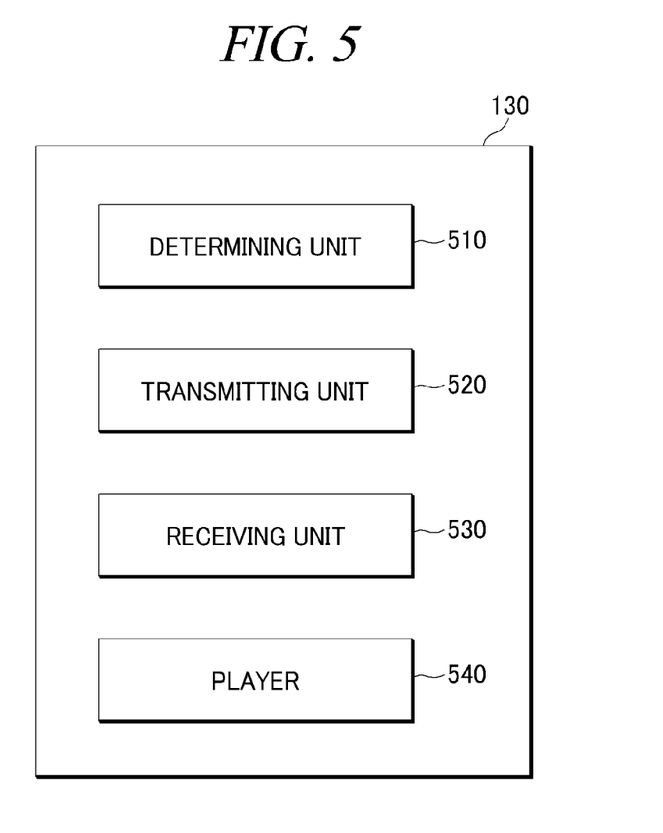
FIG. 5 shows a schematic block diagram illustrating an example architecture of an end device for providing an audio playing scheme for a digital billboard system, arranged in accordance with at least some embodiments described herein.

FIG. 5 shows a schematic block diagram illustrating an example architecture of an end device for providing an audio playing scheme for a digital billboard system, arranged in accordance with at least some embodiments described herein.

As depicted, end device 130 may include a determining unit 510, a transmitting unit 520, a receiving unit 530 and a player 540. Although illustrated as discrete components, various components may be divided into additional components, combined into fewer components, or eliminated altogether while being contemplated within the scope of the disclosed subject matter.

Determining unit 510 may be configured to determine whether end device 130 is located in a predetermined area relative to digital billboard 110.

Transmitting unit 520 may be configured to transmit, to signal receiving unit 410 of server 105, a control signal indicating that end device 130 is located in the predetermined area relative to digital billboard 110.

Receiving unit 530 may be configured to receive, from audio transmitting unit 430 of server 105, audio data corresponding to video data being currently displayed on digital billboard 110. In some embodiments, receiving unit 530 may receive, from audio transmitting unit 430, information regarding synchronization between the video data and the audio data. Player 540 may be configured to play the audio data.

In some embodiments, when end device 130 is located in an area relative to multiple digital billboards, transmitting unit 520 may transmit, to receiving unit 410 of server 105, aiming information, which may indicate a direction at which end device 130 is currently aimed, together with the control signal.

In some embodiments, when receiving unit 530 receives audio data corresponding to all relevant digital billboards, player 540 may select and play audio data corresponding to a digital billboard at which end device 130 is currently aiming. In some embodiments, player 540 may select one of the multiple digital billboards in a random manner, or based on user preference or past records for end device 130 without the using the aiming information, and play audio data corresponding thereto.

Figure 6:
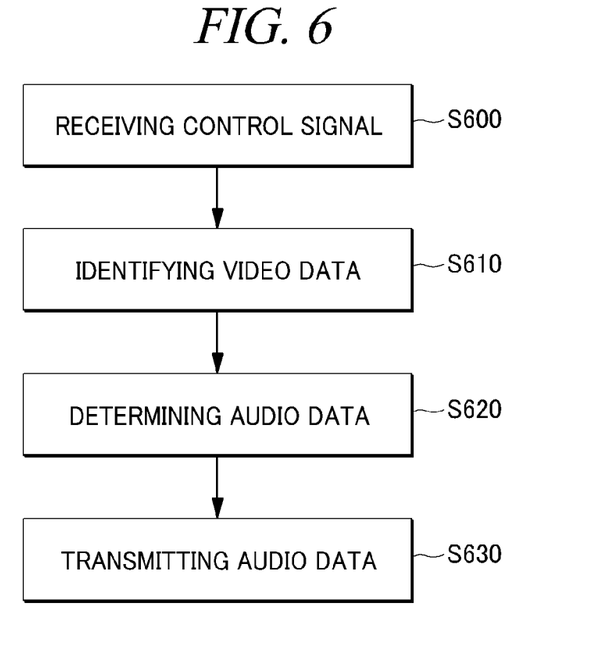
FIG. 6 shows an example flow diagram of a process performed under control of a server for providing an audio playing scheme for a digital billboard system, in accordance with at least some embodiments described herein.

FIG. 6 shows an example flow diagram of a process performed under control of a server for providing an audio playing scheme for a digital billboard system, in accordance with at least some embodiments described herein. The process in FIG. 6 may be implemented in or by server 105, which may include signal receiving unit 410, identifying unit 420, and audio transmitting unit 430 discussed above. An example process may include one or more operations, actions, or functions as illustrated by one or more blocks S600, S610, S620 and/or S630. Although illustrated as discrete blocks, various blocks may be divided into additional blocks, combined into fewer blocks, or eliminated, depending on the desired implementation. Processing may begin at block S600.

At block S600 (Receiving Control Signal), server 105 may receive, from an end device (e.g., end device 130), a control signal configured to indicate that end device 130 is located in a predetermined area relative to a digital billboard. In some embodiments, but not as a limitation, the control signal may have location information of end device 130. Processing may continue from block S600 to block S610.

At block S610 (Identifying Video Data), server 105 may identify video data being currently displayed on the digital billboard. Processing may continue from block S610 to block S620.

At block S620 (Determining Audio Data), server 105 may determine audio data corresponding the video data being currently displayed on the digital billboard. Processing may continue from block S620 to block S630.

At block S630 (Transmitting Audio Data), server 105 may transmit the audio data to end device 130 based on the control signal. In some embodiments, the server 105 may also transmit synchronization information between the video data and the audio data to end device 130.

Figure 7:
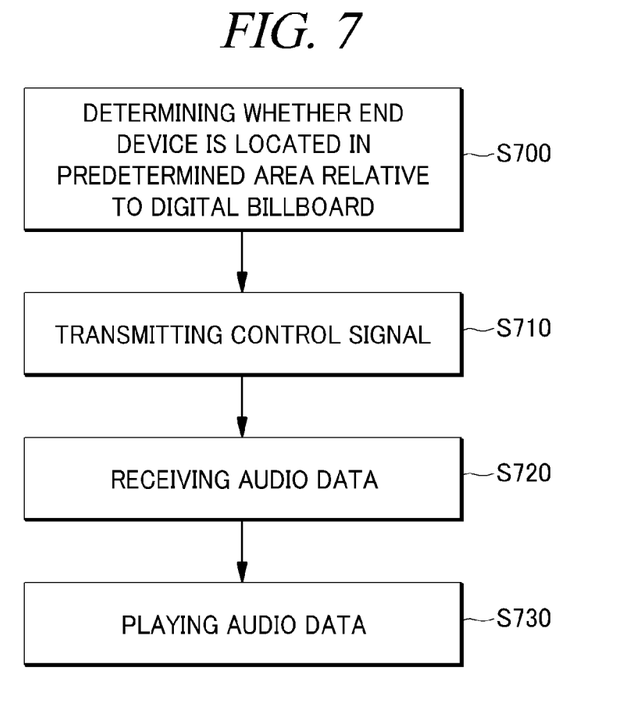
FIG. 7 shows an example flow diagram of a process performed under control of an end device for providing an audio playing scheme for a digital billboard system, in accordance with at least some embodiments described herein.

FIG. 7 shows an example flow diagram of a process performed under control of an end device for providing an audio playing scheme for a digital billboard system, in accordance with at least some embodiments described herein. The method in FIG. 7 may be implemented in or by end device 130, which may include determining unit 510, transmitting unit 520, receiving unit 530, and player 540 discussed above. An example process may include one or more operations, actions, or functions as illustrated by one or more blocks S700, S710, S720 and/or S730. Although illustrated as discrete blocks, various blocks may be divided into additional blocks, combined into fewer blocks, or eliminated, depending on the desired implementation. Processing may begin at block S700.

At block S700 (Determining Whether End Device is Located in Predetermined Area Relative to Digital Billboard), end device 130 may determine whether end device 130 is located in a predetermined area relative to one or more digital billboards. Processing may continue from block S700 to block S710.

At block S710 (Transmitting Control Signal), end device 130 may transmit to server 105 a control signal configured to indicate that end device 130 is located in the predetermined area relative to one or more digital billboards. In some embodiments, the control signal may include aiming information regarding a direction at which end device 130 is currently aiming Processing may continue from block S710 to block S720.

At block S720 (Receiving Audio Data), end device 130 may receive from server 105 audio data corresponding to video data being currently displayed on one or more digital billboards. In some embodiments, end device 130 may be in a predetermined area of multiple digital billboards. In such cases, end device 130 may receive from server 105 audio data corresponding to all relevant digital billboards (e.g., digital billboards 305 and 310). Alternatively, end device 130 may receive from server 105 audio data selected by server 105 based at least in part on the aiming information. In some embodiments, end device 130 may receive synchronization information between the video data and the audio data. In some embodiments, end device 130 may receive the audio data based at least in part on data streaming. Processing may continue from block S720 to block S730.

At block S730 (Playing Audio Data), end device 130 may play the audio data corresponding to the video data being currently displayed on the digital billboard. In the above-mentioned cases where end device 130 receives from server 105 audio data corresponding to all relevant digital billboards, end device 130 may select and play audio data corresponding to a digital billboard at which end device 130 is currently aiming. In some embodiments, end device 130 may play the audio data based at least in part on the synchronization information received from server 105.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 8:
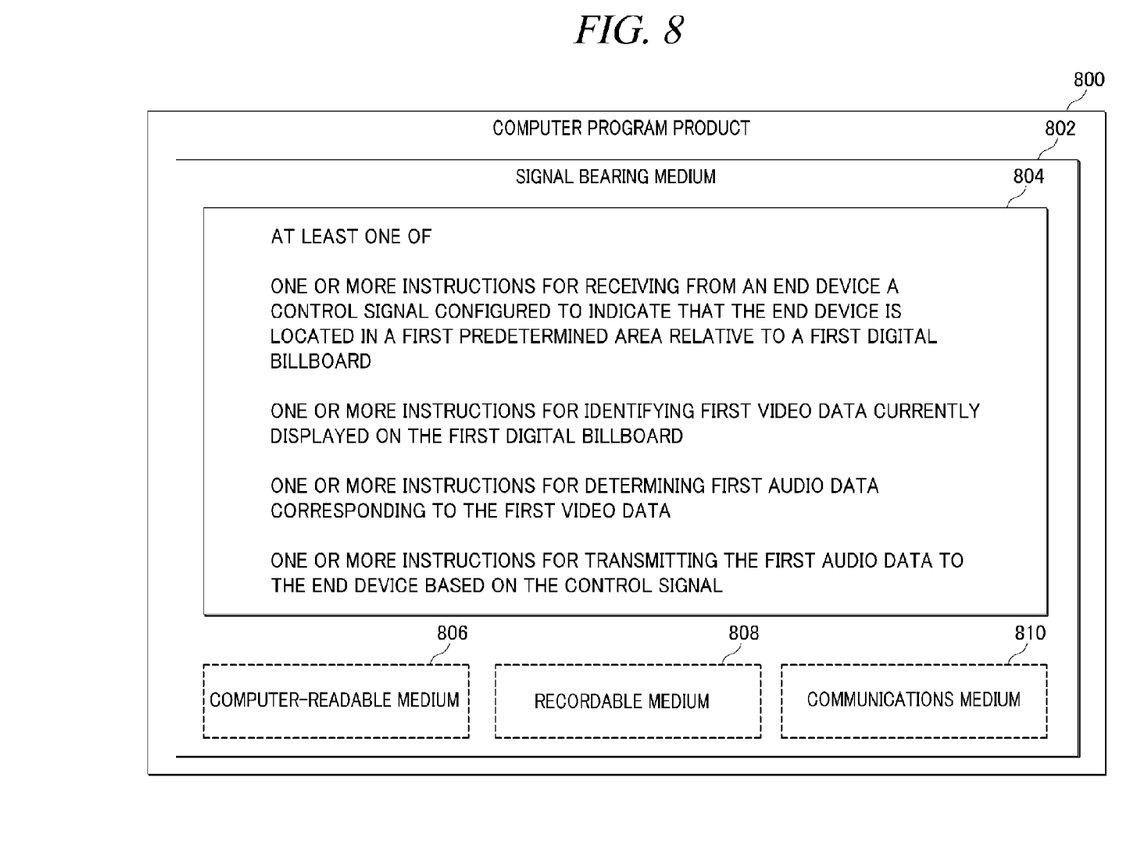
FIG. 8 illustrates computer program product that may be utilized to provide an audio playing scheme for a digital billboard system, in accordance with at least some embodiments described herein.

FIG. 8 illustrates computer program product that may be utilized to provide an audio playing scheme for a digital billboard system, in accordance with at least some embodiments described herein. Program product 800 may include a signal bearing medium 802. Signal bearing medium 802 may include one or more instructions 804 that, when executed by, for example, a processor, may provide the functionality described above with respect to FIGS. 1-7. By way of example, instructions 804 may include: one or more instructions for receiving from an end device a control signal configured to indicate that the end device is located in a first predetermined area relative to a first digital billboard; one or more instructions for identifying first video data currently displayed on the first digital billboard; one or more instructions for determining first audio data corresponding to the first video data; and one or more instructions for transmitting the first audio data to the end device based on the control signal. Thus, for example, referring to FIG. 4, server 105 may undertake one or more of the blocks shown in FIG. 6 in response to instructions 804.

In some implementations, signal bearing medium 802 may encompass a computer-readable medium 806, including, but not limited to, a hard disk drive, a CD, a DVD, a digital tape, memory, etc. In some implementations, signal bearing medium 802 may encompass a recordable medium 808, including, but not limited to, memory, read/write (R/W) CDs, R/W DVDs, etc. In some implementations, signal bearing medium 802 may encompass a communications medium 810, including, but not limited to, a digital and/or an analog communication medium (e.g., a fiber optic cable, a waveguide, a wired communications link, a wireless communication link, etc.). Thus, for example, program product 800 may be conveyed to one or more modules of server 105 by an RF signal bearing medium 802 where the signal bearing medium 802 is conveyed by a wireless communications medium 810 (e.g., a wireless communications medium conforming with the IEEE 802.11 standard).

Figure 9:
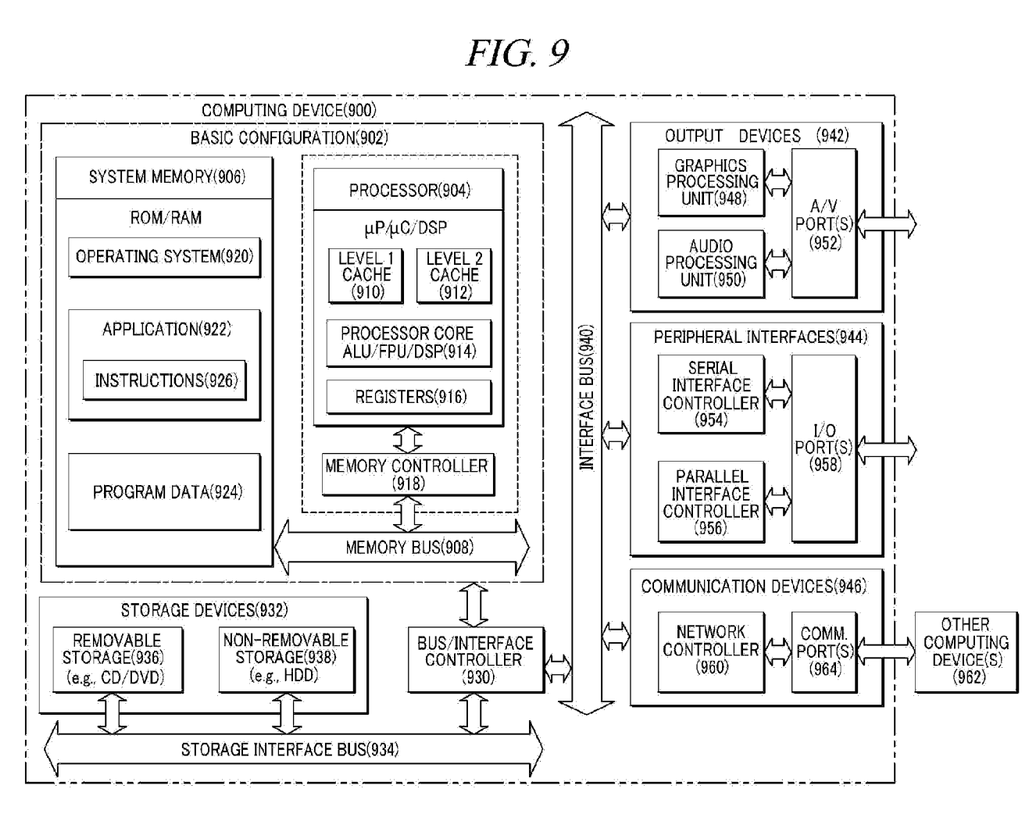
FIG. 9 is a block diagram illustrating an example computing device that may be utilized to provide an audio playing scheme for a digital billboard system, in accordance with at least some embodiments described herein.

FIG. 9 is a block diagram illustrating an example computing device 900 that may be utilized to provide an audio playing scheme for a digital billboard system, in accordance with at least some embodiments described herein. In a very basic configuration 902, computing device 900 typically includes one or more processors 904 and a system memory 906. A memory bus 908 may be used for communicating between processor 904 and system memory 906.

Depending on the desired configuration, processor 904 may be of any type including but not limited to a microprocessor (µP), a microcontroller µC), a digital signal processor (DSP), or any combination thereof. Processor 904 may include one or more levels of caching, such as a level one cache 910 and a level two cache 912, a processor core 914, and registers 916. An example processor core 914 may include an arithmetic logic unit (ALU), a floating point unit (FPU), a digital signal processing core (DSP Core), or any combination thereof. An example memory controller 918 may also be used with processor 904, or in some implementations memory controller 918 may be an internal part of processor 904.

Depending on the desired configuration, system memory 906 may be of any type including but not limited to volatile memory (such as RAM), non-volatile memory (such as ROM, flash memory, etc.) or any combination thereof. System memory 906 may include an operating system 920, one or more applications 922, and program data 924. Application 922 may include instructions 926 that may be arranged to perform the functions as described herein including the actions described with respect to the server 105 architecture as shown in FIG. 4 or including the actions described with respect to the flow charts shown in FIG. 6. In some examples, application 922 may be arranged to operate with program data 924 on an operating system 920 such that implementations for instructions for an electronic device as described herein.

Computing device 900 may have additional features or functionality, and additional interfaces to facilitate communications between basic configuration 902 and any required devices and interfaces. For example, a bus/interface controller 930 may be used to facilitate communications between basic configuration 902 and one or more data storage devices 932 via a storage interface bus 934. Data storage devices 932 may be removable storage devices 936, non-removable storage devices 938, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 906, removable storage devices 936 and non-removable storage devices 938 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 900. Any such computer storage media may be part of computing device 900.

Computing device 900 may also include an interface bus 940 for facilitating communication from various interface devices (e.g., output devices 942, peripheral interfaces 944, and communication devices 946) to basic configuration 902 via bus/interface controller 930. Example output devices 942 include a graphics processing unit 948 and an audio processing unit 950, which may be configured to communicate to various external devices such as a display or speakers via one or more A/V ports 952. Example peripheral interfaces 944 include a serial interface controller 954 or a parallel interface controller 956, which may be configured to communicate with external devices such as input devices (e.g., keyboard, mouse, pen, voice input device, touch input device, etc.) or other peripheral devices (e.g., printer, scanner, etc.) via one or more I/O ports 958. An example communication device 946 includes a network controller 960, which may be arranged to facilitate communications with one or more other computing devices 962 over a network communication link via one or more communication ports 964.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 900 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 900 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method performed under control of a server, comprising:
   transmitting first video data to a first digital billboard and second video data to a second digital billboard in real time, wherein the first video data is to be displayed on the first digital billboard and the second video data is to be displayed on the second digital billboard, and the first digital billboard and the second digital billboard are geographically separated;
   receiving from an end device a control signal indicating that the end device is located in a predetermined area relative to both the first digital billboard and the second digital billboard;
receiving from the end device aiming information indicating that the end device is currently aimed at the first digital billboard, wherein the aiming information includes an indication of a direction at which the end device is currently aiming;
   determining first audio data corresponding to the first video data currently being displayed on the first digital billboard and second audio data corresponding to the second video data currently being displayed on the second digital billboard;
   preloading the first audio data on the end device by transmitting the first audio data to the end device based on the control signal and the aiming information; and
   transmitting synchronization information to the end device, wherein the synchronization information allows for synchronization of the preloaded first audio data on the end device with the first video data being displayed on the first digital billboard.

2. The method of claim 1, wherein the transmitting the first video data to the first digital billboard is via a buffer stores the first video data and provides the first video data to the first digital billboard, and the method further comprising:
   receiving from the buffer a time stamp indicating displaying of the first video data; and
   identifying the first video data currently being displayed on the first digital billboard based at least in part on the time stamp.

3. The method of claim 1, wherein the transmitting of the first audio data is based at least in part on data streaming.

4. The method of claim 1, further comprising:
   receiving from the end device a confirmation signal indicating that the end device received the first audio signal; and
   issuing a promotion coupon to a user of the end device.

5. The method of claim 1, further comprising:
   receiving from the end device identification information that includes at least one of a picture of the first digital billboard and an image code corresponding to the first digital billboard; and
   registering the end device in an end device list based at least in part on the identification information,
   wherein the transmitting of the first audio data is based at least in part on the end device list.

6. The method of claim 5, wherein the image code is provided on or around the first digital billboard.

7. The method of claim 1, further comprising:
   receiving from the end device aiming information indicating that the end device is currently aimed at the second digital billboard; and
   transmitting to the end device the second audio data corresponding to the second video data based at least in part on the aiming information.

8. The method of claim 1, further comprising:
   transmitting to the end device both the first audio data corresponding to the first video data and the second audio data corresponding to the second video data,
   wherein the end device plays the first audio data based at least in part on the aiming information indicating that the end device is currently aimed at the first digital billboard.

9. A method performed under control of an end device, comprising:
   determining whether the end device is located in a predetermined area relative to a first digital billboard displaying first video data and a second digital billboard displaying second video data, wherein the first digital billboard and the second digital billboard are geographically separated;
   transmitting to a server a control signal indicating that the end device is located in the predetermined area relative to both the first digital billboard and the second digital billboard;
   transmitting to the server aiming information indicating that the end device is currently aimed at the first digital billboard, wherein the aiming information includes an indication of a direction at which the end device is currently aiming;
   preloading on the end device audio data received from the server based on the control signal and the aiming information, wherein the audio data is to be played in synchronism with the first video data currently being displayed on the first digital billboard;
   receiving from the server synchronization information, wherein the synchronization information allows for synchronization of the preloaded audio data on the end device with the first video data being displayed on the first digital billboard; and
   playing the audio data on the end device, the playing of the audio data being based at least in part on the synchronization information.

10. The method of claim 9, wherein the receiving of the audio data is based at least in part on data streaming.

11. The method of claim 9, further comprising:
    obtaining identification information including at least one of a picture of the first digital billboard and an image code corresponding to the first digital billboard; and
    transmitting the identification information to the server, wherein the server registers the end device in an end device list based at least in part on the identification information.

12. The method of claim 11, wherein the image code is provided on or around the first digital billboard.

13. A server, comprising:
    at least one processor; and
    memory including instructions that, when executed by the at least one processor, cause the server to:
       receive from an end device a control signal indicating that the end device is located in a predetermined area relative to both a first digital billboard and a second digital billboard, wherein the first digital billboard and the second digital billboard are geographically separated;

receive from the end device aiming information indicating that the end device is currently aimed at the first digital billboard, wherein the aiming information includes an indication of a direction at which the end device is currently aiming;

transmit first video data to the first digital billboard and second video data to the second digital billboard in real time, wherein the first video data is to be displayed on the first digital billboard and the second video data is to be displayed on the second digital billboard;

preload first audio data on the end device by transmitting the first audio data to the end device based on the control signal and the aiming information; and transmit synchronization information to the end device, wherein the synchronization information allows for synchronization of the preloaded first audio data on the end device with the first video data being displayed on the first digital billboard.

14. The server of claim 13, wherein the instructions, when executed, further cause the server to:
transmit the first video data to the first digital billboard via a buffer to store the first video data and provide the first video data to the first digital billboard,
receive from the buffer a time stamp indicating displaying of the first video data, and
identify the first video data currently being displayed on the first digital billboard based at least in part on the time stamp.

15. The server of claim 13, wherein the instructions, when executed, further cause the server to receive from the end device identification information that includes at least one of a picture of the first digital billboard and an image code corresponding to the first digital billboard.

16. The server of claim 15, wherein the image code is provided on or around the first digital billboard.

17. The server of claim 15, wherein the instructions, when executed, further cause the server to:
register the end device in an end device list based at least in part on the identification information, and
transmit the first audio data based at least in part on the end device list.

18. The server of claim 13, wherein the instructions, when executed, further cause the server to:
receive from the end device aiming information indicating that the end device is currently aimed at the second digital billboard, and
transmit to the end device second audio data corresponding to the second video data based at least in part on the aiming information.

19. The server of claim 13, the instructions when executed further cause the server to transmit to the end device both the first audio data corresponding to the first video data and second audio data corresponding to the second video data, wherein the end device plays the first audio data based at least in part on the aiming information indicating that the end device is currently aimed at the first digital billboard.

20. An end device, comprising:
at least one processor; and
memory including instructions that, when executed by the at least one processor, cause the end device to:
determine whether the end device is located in a predetermined area relative to a first digital billboard that is displaying first video data and a second digital billboard that is displaying second video data, wherein the first digital billboard and the second digital billboard are geographically separated;
transmit to a server a control signal indicating that the end device is located in the predetermined area relative to both the first digital billboard and the second digital billboard;
transmit to the server aiming information indicating that the end device is currently aimed at the first digital billboard, wherein the aiming information includes an indication of a direction at which the end device is currently aiming;
receive from the server audio data corresponding to the first video data currently being displayed on the first digital billboard to preload the audio data on the end device based on the control signal and the aiming information;
receive from the server synchronization information, wherein the synchronization information allows for synchronization of the preloaded audio data on the end device with the first video data being displayed on the first digital billboard; and
play the audio data based at least in part on the synchronization information.

21. A non-transitory computer-readable storage medium having stored thereon computer-executable instructions that, in response to execution, cause an end device to perform operations, comprising:
determining whether the end device is located in a predetermined area relative to a first digital billboard displaying first video data and a second digital billboard displaying second video data, wherein the first digital billboard and the second digital billboard are geographically separated;
transmitting to a server a control signal indicating that the end device is located in the predetermined area relative to both the first digital billboard and the second digital billboard;
transmitting to the server aiming information indicating that the end device is currently aimed at the first digital billboard, wherein the aiming information includes an indication of a direction at which the end device is currently aiming;
receiving from the server audio data corresponding to the first video data currently being displayed on the first digital billboard to preload the audio data on the end device based on the control signal and the aiming information;
receiving from the server synchronization information, wherein the synchronization information allows for synchronization of the preloaded audio data on the end device with the first video data being displayed on the first digital billboard; and
playing the audio data based at least in part on the synchronization information.

* * * * *

UNITED STATES PATENT AND TRADEMARK OFFICE
CERTIFICATE OF CORRECTION

PATENT NO.         : 9,232,115 B2                                   Page 1 of 1
APPLICATION NO.    : 13/810497
DATED              : January 5, 2016
INVENTOR(S)        : Oh It is certified that error appears in the above-identified patent and that said Letters Patent is hereby corrected as shown below:

Specification

In Column 1, Line 8, delete "§371" and insert -- § 371 --, therefor.

In Column 8, Line 63, delete "aiming Processing" and insert -- aiming. Processing --, therefor.

In Column 10, Line 14, delete "(μC)," and insert -- (μC), --, therefor.

Claims

In Column 15, Line 55, in Claim 19, delete "instructions when executed" and insert
-- instructions, when executed, --, therefor.

Signed and Sealed this
Twenty-sixth Day of April, 2016

Michelle K. Lee
*Director of the United States Patent and Trademark Office*